United States Patent Office 3,516,728
Patented June 23, 1970

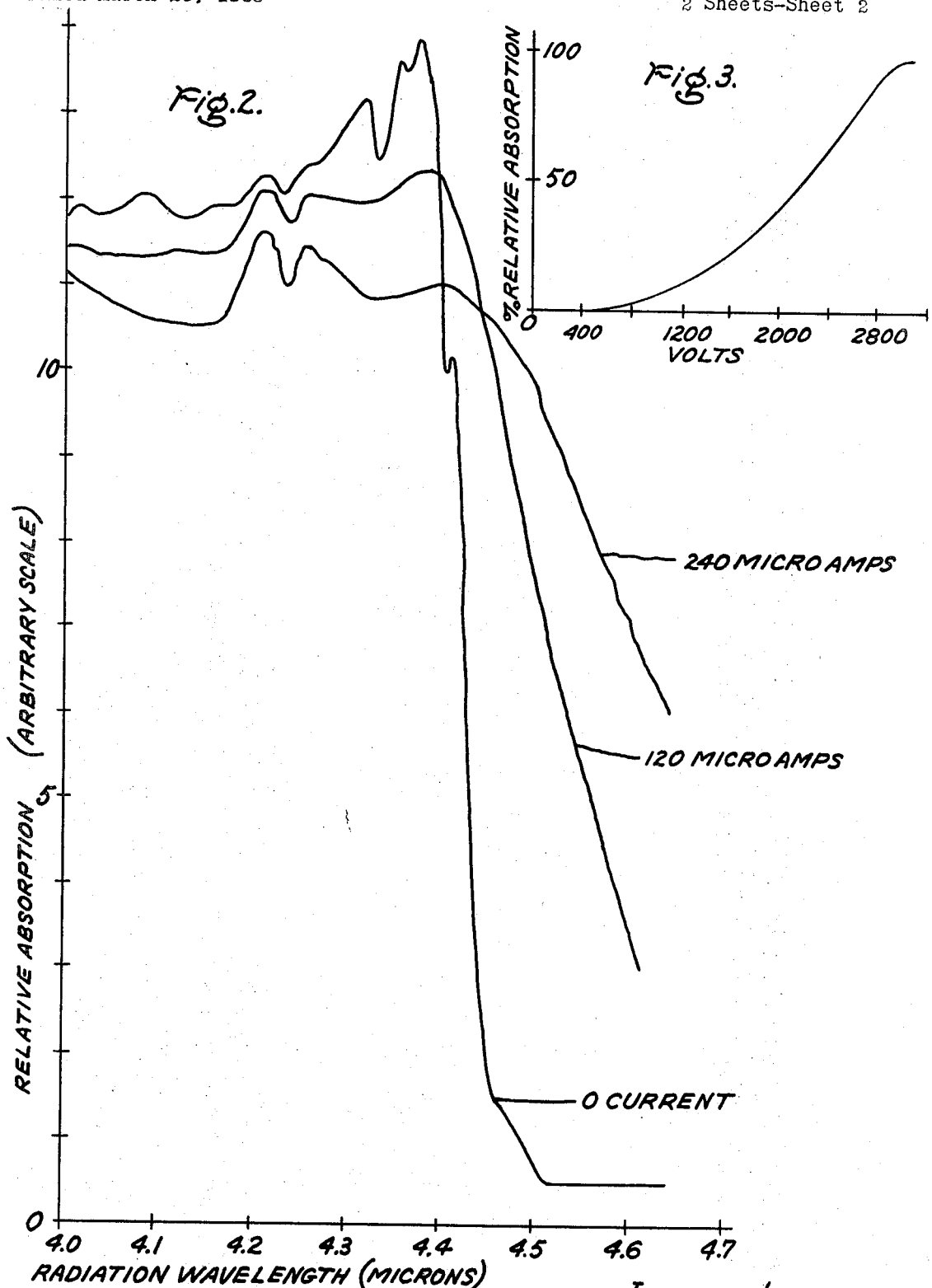

3,516,728
INFRARED INTENSITY MODULATOR WHEREIN THE OPTICAL ABSORPTION SPECTRUM OF CADMIUM TELLURIDE DOPED WITH IRON IONS IS VARIED
Gunther E. Fenner, Schenectady, N.Y., assignor to General Electric Company, a corporation of New York
Filed Mar. 20, 1968, Ser. No. 714,587
Int. Cl. G02f 1/36
U.S. Cl. 350—160                                14 Claims

ABSTRACT OF THE DISCLOSURE

An optical intensity modulator for use in the middle infrared range such as in the 4–5 micron wavelength range and especially in the 4.4–4.7 micron wavelength range is typically comprised of a cadmium telluride crystal doped with iron. By introducing free charge carriers in to the crystal, optical absorption is made to change appreciably when an electric field is applied. When the modulator is maintained at liquid helium temperatures, a high degree of modulation at frequencies in the gHz. range can be achieved.

INTRODUCTION

This invention relates to optical modulators, and more particularly to high frequency intensity modulators for infrared radiation.

Desirability of communication by infrared radiation is, in large measure, dependent upon the ease and efficiency of modulating an infrared beam of energy. At modulating frequencies in the low audio range, intensity modulation can be accomplished with a mechanical shutter arrangement, providing close to 100 percent modulation. However, at high modulating frequencies, such shutters are impractical. Electrooptic modulators, on the other hand, are often capable of operating at modulating frequencies considerably higher than frequencies in the audio range. However, electrooptic modulators have heretofore been incapable of achieving the percent modulation attainable with mechanical shutter types of modulators.

The present invention concerns an electrooptic modulator for infrared radiation which is capable of operating at modulating frequencies in the gHz. range without sacrificing the high degree of modulation obtainable from mechanical shutter types of modulators. The electrooptic modulator of the invention employs a compound semiconductor crystal such as cadmium telluride doped with a transition metal such as iron and maintained at a temperature sufficiently low to keep the optical absorption level in absence of an electric field at a desired value which is low in the wavelength range of 4.4–5.0 microns and high in the wavelength range of 4.0–4.4 microns. This also minimizes scattering of electrons within the semiconductor crystal lattice and thereby minimizes the resulting loss of energy to the lattice by electrons. This permits electrons in the conduction band of the semiconductor to be accelerated by an applied electric field and thereby gain energy. These accelerated electrons, which thus become as energetic as though the crystal lattice had been heated and are often referred to as "heated" or "hot" electrons, then suffer inelastic collisions with ions of the transition metal such as $Fe^{2+}$ ions within the crystal and hence transfer their energy to these ions. The $Fe^{2+}$ ions which have collided with the electrons are thus excited and, due to increases in the internal energy states of these ions, the optical absorption spectrum of the crystal is changed. In this manner, the crystal is made to controllably absorb or transmit optical radiation of the desired wavelength. The nature of the optical absorption spectrum of the crystal is discussed in detail by G. A. Slack et al., Optical Absorption of Tetrahedral $Fe^{2+}$ ($3d^6$) In Cubic ZnS, CdTe, ad $MgAl_2O_4$, 152 Physical Review, 376–402 (December 1966).

Accordingly, one object of the invention is to provide a small, simple and efficient intensity modulator for infrared radiation.

Another object is to provide an optical intensity modulator capable of operating at high modulating frequencies.

Another object is to provide an electrooptic modulator for achieving a high degree of modulation of infrared radiation intensity.

Briefly, in accordance with a preferred embodiment of the invention, an optical intensity modulator for infrared radiation is described. The modulator comprises a compound semiconductor crystal such as cadmium telluride doped with a transition metal such as iron upon which a beam of electro magnetic radiation in the wavelength range of 4–5 microns, or more narrowly in the range of 4.4–4.7 microns is directed. Means are provided for introducing free charge carriers in the lattice of the crystal, and means are coupled to the crystal for establishing an electric field thereon.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

FIG. 2 is a graphical illustration of relative optical absorption as a function of wavelength for several values of modulating current;

FIG. 3 is a graphical illustration of the effect of the modulator of the instant invention upon intensity of 4.6 micron wavelength electromagnetic radiation impinging thereon.

DESCRIPTION OF TYPICAL EMBODIMENTS

Figure 1:
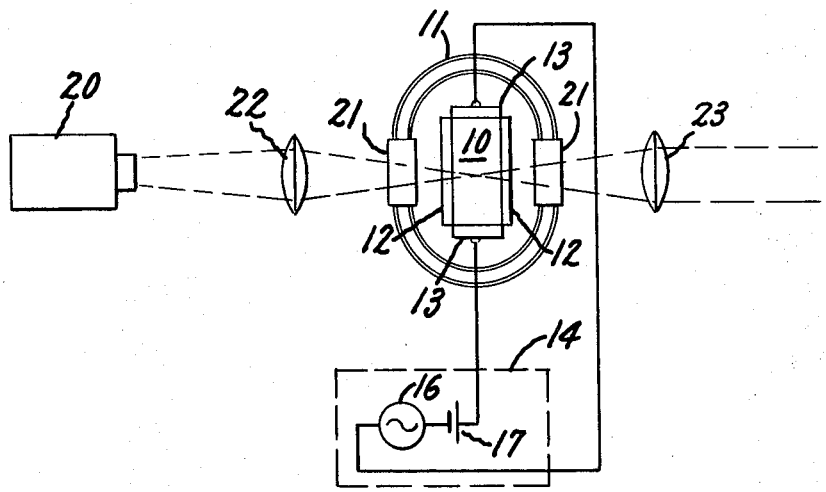
FIG. 1 is a schematic diagram of one embodiment of an infrared radiation transmitting system employing the intensity modulator of the instant invention.

In the embodiment of FIG. 1, a semiconductor crystal 10 of cadmium telluride doped with iron is illustrated within a Dewar flask 11 wherein it is maintained cryogenically at liquid helium temperatures. The crystal typically is in the form of a plate, situated so that radiation to be modulated is incident upon, and emergent from, the broad surfaces thereof. An antireflection coating 12 may be applied over the broad surfaces of the crystal in order to improve efficiency of the modulator. A pair of solder electrodes 13, comprising a mercury solution which at room temperature is saturated with indium, are applied to opposite ends of the crystal, and a modulating voltage source 14 is connected to the electrodes. The modulating voltage typically is an AC waveform superimposed on a DC voltage, such as produced by an AC voltage source 16 connected to electrodes 13 through a DC source 17.

A source of constant wavelength electromagnetic radiation 20 in the middle infrared range and preferably in the range of wavelength between 4.4 and 4.7 microns is directed through a pair of windows 21 in Dewar flask 11 which are transparent to radiation of that wavelength. Typically, these windows are comprised of sapphire. Radiation from source 20 is focused through an infrared transmissive lens 22 prior to impingement on crystal 10, and radiation emerging from crystal 10 is collimated through an objective infrared transmissive lens 23. Radiation source 20 may be highly monochromatic, and may be a source of coherent light, as a laser for example, or incoherent light; alternatively, radiation source 20 may comprise an incandescent source, as long as the emitted spectrum contains components within the wavelength range of 4.4 to 4.7 microns.

Cadmium telluride crystal 10 is doped with iron in a range of up to 0.3 mole percent, and is of relatively high resistivity prior to its use as a modulator. In order to lower resistivity of the crystal to a level compatible with its use as a modulator, free carriers must be introduced into the crystal lattice. This is accomplished by first etching the crystal, and then heating the crystal at a temperature of about 800° C., together with a quantity of cadmium, in a quartz tube evacuated to a pressure of about $10^{-5}$ millimeters of mercury. The heating is maintained for 15 to 24 hours, and is followed by fast-quenching the quartz tube in water. Excess cadmium is thereby introduced into the crystal, rendering the crystal nonstoichiometric. It is believed that this nonstoichiometry causes electrons to be introduced into the conduction band either directly, or by changing the charge state of shallow level donor impurities such as indium or chlorine. In the latter instance, the donor impurities may exist naturally in the crystal or may be artificially introduced to a level in the order of $10^{15}$ atoms per cubic centimeter during growth of the crystal. The electrons thus added to the conduction band comprise the free charge carriers in the crystal, and their presence sharply lowers the crystal resistivity.

In operation, an electric field is produced across the crystal by modulating voltage source 14. If the strength of this field is in the order of $10^3$–$10^5$ volts per centimeter, the free carriers which are accelerated gain sufficient energy so that when they collide with the iron ions in the crystal, which are $Fe^{2+}$ ions, they raise the internal energy states of the ions. As a result, the absorption spectrum of the crystal changes, and an appreciable increase in absorption of optical energy of wavelength in the order of 4.4–4.7 microns is achieved. Because of the low temperature environment, such as in the order of 4° K., the influence of lattice vibrations, which also causes $Fe^{2+}$ ions to become excited, is effectively reduced. A detailed discussion of the nature of the optical absorption spectrum of the crystal is found in the aforementioned G. A. Slack et al. paper. With the apparatus of FIG. 1, nearly 100% modulation can be accomplished for a crystal thickness between incident and emergent surfaces of approximately 1 millimeter; moreover, frequency response of the crystal is sufficiently high to permit modulation at frequencies in the gHz. range, as supplied by modulating voltage source 14.

FIG. 2 illustrates relative absorption behavior of the CdTe crystal containing $Fe^{2+}$ ions in the presence of optical radiation over a range of wavelengths, as employed in the apparatus of FIG. 1, for modulating currents of 0, 120 microamps and 240 microamps. Thus, at a radiation wavelength of 4.6 microns, for example, an increasing modulating current results in an increase in optical absorption; below a radiation wavelength of slightly less than 4.4 microns however, an increasing modulating current results in a decrease in optical absorption. Similarly, as shown in FIG. 3, a CdTe crystal of about 1.2 millimeters thickness between incident and emergent surfaces and containing $Fe^{2+}$ ions in the presence of a radiation wavelength of 4.6 microns, as employed in the apparatus of FIG. 1, exhibits an increase in relative absorption with increasing voltage applied across the crystal.

Figure 4:
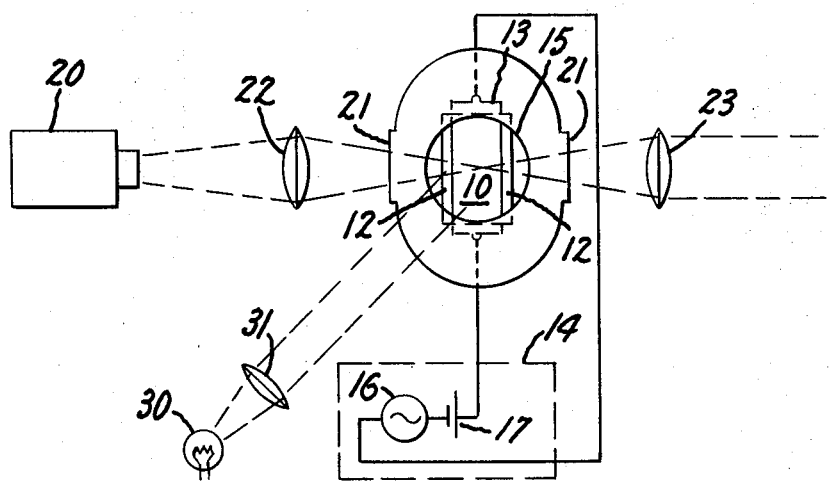
FIG. 4 is a schematic diagram of a second embodiment of an infrared radiation transmitting system employing the intensity modulator of the instant invention.

FIG. 4 illustrates a second embodiment of the modulating apparatus which is somewhat similar to the embodiment shown in FIG. 1. However, Dewar 11 is illustrated as having an additional sapphire window 15 so that illumination from a lamp 30, such as an ordinary incandescent lamp, may be focused by a lens 31 through window 15 to impinge upon crystal 10. In this embodiment, crystal 10 contains iron in a range of up to 0.3 mole percent and thus contains $Fe^{2+}$ ions as in the embodiment of FIG. 1; however, the crystal is allowed to remain in a high resistivity condition since the aforementioned process of firing the crystal together with cadmium so as to establish free carriers in the crystal is omitted. Nevertheless, by illuminating the crystal with optical radiation of energy equal to the bandgap of the crystal, typically about 0.7 micron in wavelength or shorter which exists in the spectra of incandescent lamps, free charge carriers are introduced into the crystal and changes in optical absorption again occur as previously described and in accordance with the curves of FIGS. 2 and 3. In the apparatus of FIG. 4, as well as in the apparatus of FIG. 1, up to almost 100% modulation can be achieved, together with modulation at frequencies in the gHz. range.

The foregoing describes a small, simple and efficient electrooptic intensity modulator for infrared radiation. The modulator is capable of operating at high frequency, and permits a high degree of modulation of infrarred radiation to be achieved.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

What is claimed is:

1. An optical intensity modulator for infrared radiation comprising: a compound semiconductor crystal comprising cadmium telluride, said crystal containing iron ions; means supplying free charge carriers in the lattice of said crystal; and means coupled to said crystal for establishing an electric field thereon.

2. The optical intensity modulator of claim 1 wherein the iron is in a range of up to 0.3 mole percent.

3. The optical intensity modulator of claim 2 wherein said means supplying free charge carriers in the lattice of said crystal comprises cadmium atoms within said crystal in excess of the stoichiometric quantity.

4. The optical intensity modulator of claim 2 wherein said means supplying free charge carriers comprises cadmium atoms within said crystal in excess of the stoichiometric quantity together with shallow level donor impurities.

5. The optical intensity modulator of claim 4 wherein said shallow level donor impurities comprise one of the group consisting of indium and chlorine.

6. The optical intensity modulator of claim 2 wherein said means supplying free charge carriers in the lattice of said crystal comprises means for illuminating said crystal with optical radiation of energy equal to the bandgap of said cadmium telluride crystal.

7. The optical intensity modulator of claim 2 including cryogenic means for cooling said cadmium telluride crystal.

8. An intensity modulator for infrared radiation comprising: a monocrystalline cadmium telluride plate, said plate being doped with iron in a range of up to 0.3 mole percent; means directing a beam of infrared radiation of predetermined wavelength onto said plate; means supplying free charge carriers in the crystal lattice of said plate; and means coupled to said plate for establishing an electric field thereon.

9. The intensity modulator for infrared radiation of claim 8 wherein said means supplying free charge carriers in the crystal lattice of said plate comprises cadmium atoms within said monocrystalline plate in excess of the stoichiometric quantity.

10. The intensity modulator for infrared radiation of claim 8 wherein said means supplying free charge carriers in the crystal lattice of said plate comprises cadmium atoms within said monocrystalline plate in excess of the stoichiometric quantity together with shallow level donor impurities.

11. The intensity modulator for infrared radiation of claim 10 wherein said shallow level donor impurities comprise one of the group consisting of indium and chlorine.

12. The intensity modulator for infrared radiation of claim 8 wherein said means supplying free charge carriers within the crystal lattice of said plate comprises means for illuminating said plate with optical radiation of energy equal to the bandgap of said monocrystalline cadmium telluride plate.

13. The intensity modulator for infrared radiation of claim 8 including cryogenic means for cooling said cadmium telluride plate.

14. The intensity modulator for infrared radiation of claim 8 including antireflection coatings disposed on the surfaces of said cadmium telluride plate passing incident and emergent radiation.

References Cited

UNITED STATES PATENTS

| | | |
|---|---|---|
| 3,025,763 | 3/1962 | Schwartz et al. |
| 3,259,016 | 7/1966 | Rosenblum. |
| 3,271,578 | 9/1966 | Bockemuehl. |
| 3,331,036 | 7/1967 | Colbow. |
| 3,403,283 | 9/1968 | Chernow et al. |

OTHER REFERENCES

Myers et al.: Applied Physis Letters, vol. 9, pp. 326–328, November 1966.

Stafsudd et al.: Applied Optics, vol. 6, p. 1276, July 1967.

Williams, Physical Review, vol. 117, pp. 1487–90, March 1960.

RONALD L. WIBERT, Primary Examiner

E. BAUER, Assistant Examiner

U.S. Cl. X.R.
350—150